United States Patent [19]

Shibata et al.

[11] 4,238,570

[45] Dec. 9, 1980

[54] NOVEL EXPANDABLE PARTICLES OF A STYRENE POLYMER AND PROCESS FOR PREPARING THE SAME

[75] Inventors: Hideaki Shibata; Michihisa Osawa, both of Ichihara, Japan

[73] Assignee: Hitachi Chemical Company, Ltd., Tokyo, Japan

[21] Appl. No.: 14,716

[22] Filed: Feb. 23, 1979

Related U.S. Application Data

[63] Continuation of Ser. No. 873,898, Jan. 31, 1978, abandoned.

[30] Foreign Application Priority Data

Feb. 4, 1977 [JP] Japan .................................. 52-11341

[51] Int. Cl.³ .............................................. C08J 9/22
[52] U.S. Cl. ...................................... 521/57; 427/222; 521/58; 521/97
[58] Field of Search .......................................... 521/57

[56] References Cited

U.S. PATENT DOCUMENTS

| 2,989,782 | 6/1961 | Barkuff, Jr. et al. | 260/2.5 B |
| 3,560,414 | 2/1971 | Miskel, Jr. et al. | 260/2.5 B |
| 3,789,028 | 1/1974 | Heiskel | 260/2.5 B |
| 4,003,858 | 1/1977 | Biglione et al. | 260/2.5 B |
| 4,042,541 | 8/1977 | Watts | 260/2.5 B |

OTHER PUBLICATIONS

"The Chemistry & Technology of Waxes", by Warth, Copyright 1956, pp. 535-537.

*Primary Examiner*—Morton Foelak
*Attorney, Agent, or Firm*—Frishauf, Holtz, Goodman & Woodward

[57] ABSTRACT

Expandable particles of a styrene polymer which comprise on the surface thereof an ester of an aliphatic carboxylic acid with an aliphatic alcohol, the ester having no hydroxyl group in the molecule and being a solid at room temperature, or a mixture of said ester and a finely divided lubricant, and a process for preparing the same.

7 Claims, No Drawings

NOVEL EXPANDABLE PARTICLES OF A STYRENE POLYMER AND PROCESS FOR PREPARING THE SAME

This application is a continuation of application Ser. No. 873,898, filed Jan. 31, 1978, now abandoned.

This invention relates to novel expandable particles of a styrene polymer and a process for preparing the same. More particularly, this invention relates to expandable particles of a styrene polymer capable of reducing remarkably the cooling time during molding, which particles contain on the surface of the styrene polymer particles containing a blowing agent, an ester of an aliphatic carboxylic acid with an aliphatic alcohol, the ester having no hydroxyl group and being a solid at room temperature, or a mixture of said ester and a finely divided lubricant, and to a process for preparing the same.

A process which has widely been carried out for manufacturing expended articles of a styrene polymer comprises heating expandable particles of a styrene polymer with steam to foam or expand the same (pre-expansion); allowing to stand for a certain period of time (maturing); heating the thus matured particles with steam after charging the same into a mold having small apertures (final expansion); opening the mold after cooling it to reduce the expanding pressure of the interior part of the molded article; and then taking out the molded article. In these steps, the cooling time of a mold gives the greatest influence upon the productivity of articles.

Accordingly, it is required to reduce the cooling time during molding of an expanded article of a styrene polymer. Such requirements have been strong particularly for manufacturing of a large size cubical article called "block" of low density (highly-expanded article having a bulk density of 13-17 g/l). Recently, however, moderately- or low-expanded articles of relatively high density (bulk density: 25-200 g/l) have been applied for structural parts having heat insulating property. Since characteristics of an article require a severe precision of the dimensions, it is necessary to mold the article so as not to cause deformation by the residual expanding pressure after heating for molding and not to cause shrinkage by the over-cooling.

Therefore, the cooling during molding has been effected mildly over a long period of time. So, the shortening of the cooling time during molding is required strongly.

There have hitherto been known several methods for shortening the cooling time during molding with respect to a large size cube called "block" mentioned above.

It is described for example in U.S. Pat. No. 2,989,782 that the molding time can be reduced by incorporating on the outer shell or on the surface of expandable particles of a styrene polymer a liquid organic compound having a boiling point of not less than 100° C., for example, an aromatic compound such as benzene, a chlorinated hydrocarbon such as chlorobenzene, an alkyl ester of phthalic acid such as dimethyl phthalate, linseed oil, a monoglyceride of a fatty acid having 12-20 carbon atoms and so on. According to the method, however, the liquid organic compound permeates into the vicinity of the surface of the expandable particles of a styrene polymer due to the strong affinity thereof with the styrene polymer, and thus affords tackiness to the particles before expansion and is apt to cause blocking during pre-expansion. Further, the method has a defect that the liquid organic compound permeates into the interior part or core part of the expandable particles of a styrene polymer during their storage and thus the effect of the compound is reduced remarkably. Although the prior invention employs a blowing agent which is a liquid at room temperature under atmospheric pressure, however, if the liquid organic compound mentioned above be applied for styrene polymer particles containing a blowing agent which is a gas at room temperature under atmospheric pressure, the defect would be increased remarkably and hence the method could not be applied practically. Because, in the case of a blowing agent which is a gas at room temperature under atmospheric pressure, a crack is apt to be caused in the particles due to the large pressure within the particle and the blowing agent leaks quickly from the crack so that the blowability is lost.

It is described in German Patent Provisional Publication (Offenlegungsschrift) No. 2,133,253 and U.S. Pat. No. 3,789,028 that reduction of the cooling time during molding and better fusing of the expanded particles can be attained by coating the surface of the expandable particles of a styrene polymer with a lipophilic surfactant, more concretely a mixture of mono-, di- and tri-esters of glycerol with a saturated fatty acid.

We have found, as will be described detailedly hereinbelow, that the effect of these lipophilic surfactants, that is, partial esters of glycerol with a saturated fatty acid on the reduction of the cooling time during molding is governed by a structural part other than the part having a hydroxyl group in the molecule of the partial esters, that is, a structural part having an ester group, and that such surfactants have a defect that the amount of water adhered to the surface of the pre-expanded particles, the water being produced by the condensation of steam during expansion, becomes large and thus water content in a molded article during molding is increased.

We have found further that a liquid triglyceride of a fatty acid exemplified by linseed oil can solve these problems and can effect the shortening of the cooling time during molding when applied for expandable particles of a styrene polymer containing a blowing agent which is gaseous at room temperature under atmospheric pressure, without showing any defects as mentioned above. However, the crack of the particles sometimes occurs due to the permeation of the above-mentioned liquid triglyceride of a fatty acid into the interior part of the expandable particles of a styrene polymer.

As a result of our extensive investigations, it has been found that an ester of an aliphatic carboxylic acid with an aliphatic alcohol which is a solid at room temperature, for example, a triglyceride of a fatty acid which is a solid at room temperature is superior. That is, as compared with a triglyceride of a fatty acid which is a liquid at room temperature, such a solid ester reduces further the blocking during pre-expansion; there is no possibility of the above-mentioned defects caused by the permeation of the ester into the expandable particles of a styrene polymer; the effect of the shortening of the cooling time during molding is not reduced even when the particles are stored for a long period of time; and further the ester can easily be added to the expandable particles of a styrene polymer with a mixing machine and the like by using the ester in a powdery state.

Further, as a result of a series of the investigations as to the effect of a fatty acid ester on the shortening of the cooling time during molding of expandable particles of a styrene polymer, we have found that a compound having a hydroxyl group in the molecule does not show any effect on the reduction of the cooling time at all or shows little effect thereon.

That is, no effect is shown in the case of a compound having a hydroxyl group in the carbon chain, for example, a triglyceride of a hydroxy-fatty acid (main component of castor oil) and a triglyceride of a hydrogenated hydroxy-fatty acid (usually named as a hardened castor oil), further, in the case of a partial ester among esters of a polyhydric alcohol with a common fatty acid, the higher the rate of the remaining alcoholic part is, the less the effect becomes.

Additionally, a hydroxyl group in the structure of a fatty acid ester affords hydrophilic properties to the particles when it is applied on the surface of expandable particles of a styrene polymer, and thus increases the water content during pre-expansion and final expansion with steam. In order to remove the water contained, additional time for drying is required. Further, the water is liable to leak disadvantageously in particular at the part being incomplete in interior fusion in the molded article and be absorbed by the molded article itself, in cases where the article is such a container as a fish box, etc., or a structural part which contacts with ice or water.

In Japanese Patent Publication No. Sho-39-22212/1964, it is disclosed that an expanded article having a fine and homogeneous cells therein can be obtained by incorporating in the expandable particles of a styrene polymer isopentane being a liquid at room temperature and under atmospheric pressure as a blowing agent, or a paraffin group hydrocarbon, a saturated or unsaturated nitrile or an ester of an aliphatic alcohol having 10-60 carbon atoms in the carbon chain with a saturated or unsaturated, substituted or unsubstituted fatty acid as a nucleus forming agent. The present invention effects the shortening of the cooling time during molding by using expandable particles of a styrene polymer containing an ester of an aliphatic carboxylic acid with an aliphatic alcohol (having no hydroxyl group in the molecule) on the surface and/or in the vicinity of the surface, thus being different basically from the prior art with respect to the object, the constitution and the effect.

Our invention relates to novel expandable particles of a styrene polymer which comprise on the surface thereof, an ester obtainable from an aliphatic carboxylic acid and an aliphatic alcohol, the ester having no hydroxyl group in the molecule and being a solid at room temperature or a mixture of said ester and a finely divided lubricant.

The ester of an aliphatic carboxylic acid with an aliphatic alcohol used in the present invention satisfies the following conditions. First of all, the ester should not have a hydroxyl group in the molecule. As the cases where a hydroxyl group exists, there may be mentioned a case where a hydroxyl group exists in the carbon chain as in an ester of a hydroxy-fatty acid, and a case where a hydroxyl group exists as an alcoholic hydroxyl group of the non-esterified part as in a partial ester of a polyhydric alcohol with a fatty acid. In the present invention, that the ester does not have a hydroxyl group in the molecule means that a hydroxyl group does not exist in the states of both cases mentioned above. The reason why this condition should be considered additionally resides in that the existence of a hydroxyl group in the molecule shows, as mentioned above, no or little effect of the shortening of the cooling time during molding and in that the water content in the expanded article during molding with steam is increased since the hydroxyl group acts as a hydrophilic group and thus is apt to cause an accident due to the hydrophilic property at the parts being incomplete in fusing in the molded article itself.

The second condition is that the ester should be a solid at room temperature under atmospheric pressure, preferably melting at 50°-110° C.

The reason why the ester should be a solid resides in that it prevents the cracking of the particle on account of the deep permeation thereof into the inner part of the particle.

The reason why the ester has a preferable range of the melting point resides in the following.

The reason why the ester preferably possesses a melting point of not less than 50° C. is that it is difficult to divide an ester showing a melting point below 50° C. into a powdery one passing through a sieve of 60 mesh while a finely divided powder is preferable in particular to coat effectively the surface of expandable particles of a styrene polymer with an solid ester of an aliphatic carboxylic acid with an aliphatic alcohol, and that an ester showing a melting point below 50° C. is apt to reagglomerate in the course of storage and handling even when it has been divided finely with a cooling-grinder or the like.

The reason why the melting point of the ester may preferably be not more than 110° C. is that the mutual fusion of the expandable particles of a styrene polymer should not be inhibited during molding by melting the ester at a temperature below 110° C. since the lower limit of the temperature in the molded article during final expansion is generally 110° C.

Ester compounds of an aliphatic carboxylic acid with an aliphatic alcohol, which satisfy the two conditions mentioned above, may be exemplified as follows.

As the aliphatic alcohols may be mentioned for example, a monohydric alcohol such as pentyl alcohol, hexyl alcohol, octyl alcohol, decanyl alcohol, lauryl alcohol, palmityl alcohol, stearyl alcohol, behenyl alcohol, etc.; a dihydric alcohol such as ethylene glycol, propylene glycol, etc.; a trihydric alcohol such as glycerol etc.; and a tetrahydric alcohol such as pentaerythritol etc.

As the aliphatic carboxylic acids may be mentioned for example a saturated monobasic acid such as lauric acid, palmitic acid, stearic acid, arachidic acid, behenic acid, cirotic acid, melissic acid, etc.; an unsaturated monobasic acid such as oleic acid, linoleic acid, etc.; a dibasic acid such as adipic acid, succinic acid, sebacic acid, maleic acid, etc.

The esters mentioned above according to this invention are of these aliphatic carboxylic acids with these aliphatic alcohols, which contain no hydroxyl group.

Among these esters, some of them are contained in a commercially available substance called, for example, as hardened beef tallow oil, hardened rapeseed oil, hardened fish oil or hardened wax.

The amount of the above-mentioned ester to be used is in the range of from about 0.3 to 0.5% by weight calculated on the expandable particles of a styrene polymer, while it is necessary to take the particle size, or the specific surface area thereof into consideration.

In cases where the amount is beyond 0.5% by weight, partial shrinkage of the molded article sometimes occurs and there appears a tendency that the mechanical strength of the molded article obtained finally is decreased, since the shortening of the cooling time is effected in excess. In cases where the amount is below 0.03, the effect is too low. The ester of the present invention is used preferably in an amount of 0.05-0.3% by weight calculated on the amount of the expandable particles. In general, sufficient effect can be attained in an amount of not more than 0.3% by weight. In cases where the amount is more than 0.3% by weight, a portion of the ester mentioned above is subjected to desorption during the transportation by air of the expandable particles of a styrene polymer to cause the plugging of a filter in an air-transportation apparatus. The above-mentioned ester may partially be permeated into the vicinity of the surface of the expandable particle of a styrene polymer.

The expandable particles of a styrene polymer used in the present invention are prepared by incorporating into a styrene polymer, a blowing agent by using, as occasion demands, a solvent as a plasticizer having an affinity to the styrene polymer, or a foam adjusting agent, a blocking inhibitor and so on.

The styrene polymer according to this invention includes a polymer of styrene monomer per se and a copolymer of styrene with one or more other monomers such as, for example, methyl acrylate, ethyl acrylate, propyl acrylate, butyl acrylate, methyl methacrylate, hydroxyethyl methacrylate, acrylonitrile, α-methylstyrene, butadiene, divinylbenzene, ethylene glycol dimethacrylate, etc., the amount of which is preferably not less than 50 wt.% of styrene monomer. The styrene polymer of this invention also includes a blended mixture of polystyrene as a main component and other polymers, for example, a blended mixture of polystyrene and polyethylene, a blended mixture of polystyrene and polyphenylene oxide, and so forth.

The above-mentioned blowing agent is a petroleum hydrocarbon which is gaseous at room temperature and under atmospheric pressure or a mixture of the hydrocarbon as a main component and a blowing agent which is a liquid at room temperature and under atmospheric pressure.

The blowing agent being a liquid at room temperature includes n-pentane, isopentane, neo-pentane, n-hexane, isohexane and the like, which however remain in the particles for a long period of time after pre-expansion and reduce the effect of shortening of the cooling time at the time of final expansion, which effect is brought about by the ester of an aliphatic acid with an aliphatic alcohol according to this invention.

Accordingly, it is preferable to use a blowing agent containing one or more compounds such as n-butane, isobutane, propane, methyl chloride, dichlorodifluoromethane, etc., which are gaseous at room temperature under atmospheric pressure or a blowing agent containing one or more compounds mentioned above as main components.

In cases where a liquid blowing agent is used in combination with a gaseous one, it is preferable to use the same in an amount of less than 50% by weight calculated on the total blowing agent.

The plasticizer mentioned above may or may not be used in the present invention. The kind of the plasticizer and the amount to be used thereof is not limitative. As the plasticizer may be mentioned an aromatic hydrocarbon such as styrene monomer, ethylbenzene, toluene, etc., a cycloaliphatic hydrocarbon such as cyclohexane, cyclopentane, etc., a chain aliphatic hydrocarbon such as heptane, octane, etc., and so on, which may usually be used in an amount of not more than 3% by weight based on the styrene polymer.

As the finely divided lubricant may be mentioned a metal soap such as zinc stearate, calcium stearate, aluminum stearate, cadmium stearate, etc., a fatty acid amide such as ethylenebisstearoamide, methylenebisstearoamide, stearic acid amide, etc., and so on.

The ester mentioned above can show sufficient effect if it is used solely. However, when it is used in combination with the finely divided lubricant mentioned above, some secondary effects may be given. A super-finely divided lubricant passing through a sieve of 300 mesh is preferred especially.

When an ester having a melting point of not more than around 70° C. among the esters mentioned above is used, the lower layer of the particles which are stored in summer particularly after being packed in bags and piled up, are fused with each other to agglomerate and produce coarse particles, and thus the property at the time of practicing this invention is worsened remarkably and regrinding sometimes is required. Such phenomena may be prevented by mixing preliminarily a finely divided lubricant with the ester. It may be considered that it is because the finely divided lubricant adherees on the surface of the ester powders and protect the same so as to act as a dispersing agent for the ester.

The ratio of the finely divided lubricant to be used against the ester is 1/1-1/300 by weight, preferably 1/1-3/100 by weight.

As the methods for incorporating the ester of an aliphatic carboxylic acid with an aliphatic alcohol onto the surface of the expandable particles of a styrene polymer, there may be mentioned a method in which the ester in a powdery state is mixed mechanically with the expandable particles of a styrene polymer; a method in which a solution of the ester in a solvent, e.g., a lower alcohol such as methanol, ethanol, etc., a lower aliphatic hydrocarbon such as pentane, hexane, etc., is mixed with the expandable particles of a styrene polymer and then the solvent is removed by evaporation; and so on. However, the former method is more preferable than the latter.

A particularly effective method is one in which a powder of the above-mentioned ester passing through a sieve of 60 mesh, preferably of 100 mesh is mixed and blended with the expandable particles of a styrene polymer to coat the surface of the particles with the ester.

Our invention also relates to a process for preparing novel expandable particles of a styrene polymer which comprises mixing with stirring an ester of an aliphatic carboxylic acid with an aliphatic alcohol, having no hydroxyl group in the molecule, melting at 50°-110° C. and passing through a sieve of 60 mesh, or a mixture of said ester and a finely divided lubricant, with expandable particles of a styrene polymer. The ester, the expandable particles of styrene polymer, the finely divided lubricant and the amounts of these agents are the same as stated hereinbefore.

If the ester is used after being mixed with the finely divided lubricant, the homogenous application thereof to the surface of the expandable particles of a styrene polymer can readily be accomplished by mixing the ester powders with stirring. In cases where the application is carried out by means of an automatic mixing tank (Henschel's mixer) of batch system having a stirring fin rotatable in high speed, the ester mentioned above is dropped through a pipe and introduced into the apparatus by means of a screw feeder. In such a case, the flowability of the powdery substances has a great influence upon the quantitative addition thereof. When the ester power is solely used, the flowability is insufficient and the ester powder sometimes stays in the feeder, but when it is used after being mixed with a finely divided lubricant, the defect can be removed. In addition, the combined use thereof increases the lubricant property and the flowability so that the heat generated by the friction of the particles can be reduced and a homogeneous coating can be attained in a short time.

In cases where an ester of an aliphatic carboxylic acid with an aliphatic alcohol having melting point of below around 70° C., even when it is a solid at room temperature, is fused again by the impact during pulverization and shows tackiness to adhere the particles so that such an ester is difficult to be divided finely according to a usual method. In such a case, it is necessary to pulverize such an ester under cooling with dry ice, a liquid nitrogen or the like.

Next, the Examples of this invention will be shown below. In the Examples, "%" means "% by weight".

EXAMPLE 1

Ten kg of expandable particles of polystyrene having a diameter of 1-1.2 mm was gotten ready.

This is a polystyrene having a relative viscosity of 2.1 measured in a 1% toluene solution at 30° with an Ubbelohde viscometer, in which were incorporated 1.5% of ethylbenzene, 0.2% of styrene monomer, and 4% of a mixed blowing agent consisting of propane and butane (4/6 by weight) and on the surface of which was added 0.08% of ethylenebisstearoamide.

On the other hand, there was gotten ready 10 kg of a triester of glycerol with a mixture of saturated fatty acids consisting of 63% of stearic acid, 30% of palmitic acid, 4% of myristic acid and 3% of other fatty acids, which ester has a melting point of 59° C. determined by an ascending method and is in the form of flakes (manufactured by NIPPON YUSHI Co., Ltd., extremely hardened beef tallow). To the ester was added 5 kg of pulverized dry ice and the mixture was pulverized with an impact-type grinder. Thus, a finely divided triglyceride of a saturated fatty acid having a grain size passing through a sieve of 100 mesh was obtained. To 5 kg of the powder was added 0.25 kg of zinc stearate and mixed sufficiently.

Next, 10 kg of the expandable particles of the polystyrene which had been provided already and 21 g (the amount of triglyceride: 20 g, 0.2% based on expandable particles) of a finely divided mixture of the triglyceride of mixed saturated fatty acids and zinc stearate were introduced into a highspeed mixer (Super-mixer-SMV-20 manufactured by KAWADA SEISAKUSHO) and mixed with stirring for 40 seconds.

One kg of the thus treated particles was taken and expanded by heating for 2 minutes and 20 seconds to give a pre-expanded particle having a bulk density of 30 g/l. Neither blocking nor leakage of water from the surface of the particles was observed.

The thus expanded particles were placed in a net of polyvinylidene chloride. After being allowed to stand for 24 hours, a forming test was performed to determine the cooling time required, the fusing degree in the interior part of the expanded article and the water content during molding.

The determination of the cooling time required was carried out according to the following procedure. The heating was effected under the conditions in which the time required until the pressure in a mold becomes 1.2 kg/cm$^2$ is 30 seconds by using a steam having an original pressure of 3 kg/cm$^2$. After completion of the heating, water was passed through the outer part of the mold. When the surface temperature of the mold decreased down to around 70° C., the passage of the cooling water was stopped. After being allowed to stand, the molded article was taken out from the mold when the temperature got to approximately 70° C.

The mold used for the molding had dimensions of 50×75×400 m/m for a thick part and dimensions of 10×75×400 m/m for a thin part. The article molded with the mold was supposed to be a heat-insulating structural part interposed between the freezing room and the cooling room of a two-door type refrigerator. If the cooling is insufficient, the part having a thickness of 50 m/m swells and the thin part was warped and distorted. However, when the article was given an appropriate cooling, the thickness of the thick part became 49–50 m/m and the thin part was not warped and distorted.

The time required for cooling was measured as a sum of the times required for water-cooling and air-cooling which were necessary for the thick part of the molded article to be 50 m/m.

Water content (%) during molding is shown as a value calculated according to the following equation $$\frac{\left(\begin{array}{c}\text{weight immediately}\\ \text{after molding}\end{array}\right) - \left(\begin{array}{c}\text{weight after dried}\\ \text{at } 40° \text{ C. for 48 hours}\end{array}\right)}{\text{weight after dried at } 40° \text{ C. for 48 hours}} \times 100 \ (\%)$$

The interior fusing degree is shown as a percentage of particles broken at the part other than the boundary of particles, when the thick part of 50 m/m thick is subjected to breakage.

The water absorption of a molded article was determined according to Japanese Industrial Standard (JIS) A-9511-1974. It was calculated according to the following equation.

Water absorption (%) =

$$\frac{\left(\begin{array}{c}\text{weight of a sample strip}\\ \text{after water-absorption}\end{array}\right) - \left(\begin{array}{c}\text{weight of a sample strip}\\ \text{before water-absorption}\end{array}\right)}{\text{weight of a sample strip before water-absorption}} \times 100$$

The measuring methods and the measured values mentioned above are applied in the same way to the Examples described below.

In this Example, the time required for cooling was 130 seconds; the water content during molding was 13%; the interior fusing degree was 80%; and the water absorption of the molded article was 4.6%.

EXAMPLE 2

An experiment was run in the same manner with the same materials as in Example 1 except that 10.5 g (amount of triglyceride: 10 g, 0.1% based on expandable particles) of a mixture of the triglyceride of mixed saturated fatty acids and zinc stearate was used. Time required for cooling: 170 seconds. Interior fusing degree:

80%. Water content during molding: 10%. Water absorption of a molded article: 4.1%.

EXAMPLE 3

An experiment was run in the same manner as in Example 1 except that 5.025 g (amount of triglyceride: 5 g, 0.05% based on expandable particles) of a mixture of the triglyceride of mixed saturated fatty acids and zinc stearate was used. The results were as follows:
Time required for cooling: 190 seconds
Interior fusing degree: 70%
Water content during molding: 9%
Water absorption of the molded article: 3.3%

EXAMPLE 4

One kg of the same expandable particles of polystyrene as in Example 1 was taken. To the particles was added a solution obtained by dissolving 2 g of cetyl palmitate (manufactured by SHINNIPPON RIKA Co., Ltd., hardened wax) in 10 g of ethyl alcohol heated to 40° C., and the mixture was mixed by shaking in a bag of plastics. With respect to the thus treated particles, similar evaluation was conducted.
Time required for cooling: 180 seconds
Interior fusing degree: 70%
Water content during molding: 13%
Water absorption of the molded article: 5.9%

COMPARATIVE EXAMPLE 1

One kg of the same expandable particles of polystyrene as used in Example 1 was taken, and evaluation was conducted according to the same methods. The results were as follows.
Time required for cooling: 270 seconds
Interior fusing degree: 60%
Water content during molding: 9%
Water absorption of the molded article: 2.8%

COMPARATIVE EXAMPLES 2-5

To each 1 kg of the same expandable particles of polystyrene as used in Example 1 was added 0.2% of each of (1) sorbitan monopalmitate, (2) stearic acid and (3) hydroxystearic acid triglyceride in a powdery state, and (4) a mixture of mono- and di-glycerides of oleic acid in a liquid state. Evaluations were conducted according to the Examples. The results for each treated particles are as follows.
Time required for cooling; 270-300 seconds
The shortening of the cooling was not effected or only slightly effected.
Water content during molding: 24-34% (high)
Water absorption of the molded articles: 13.6-27.2% (high)

COMPARATIVE EXAMPLES 6-8

To each 1 kg of the same expandable particles of polystyrene used in Example 1 was added by mixing each of 20, 30 and 40 g of mixed partial esters of stearic acid (monoester: 45%, diester: 45%, triester: 10%) in a finely divided state. Evaluations were conducted in the similar manners to Example 1.
The results are shown in Table 1. As shown in the Table, the times required for cooling were 220-190 seconds, which shows that a larger effect than Comparative examples 2-5 was observed but the effect was less than those according to this invention in the case of the same amounts of the added esters. To attain approximately the same effect of the shortening of the cooling time, not less than 0.3% of the ester is necessarily added. Water contents during molding and water absorption of the molded articles are not less than 20% and not less than 10%, respectively, with respect to every group of the treated particles.

The results obtained by evaluation of the Examples and the Comparative examples are shown in Table 1.

TABLE 1.

| | Additive | Added amount (%) | Water content during molding (%) | Interior fusing degree (%) | Time required for cooling (second) | Water absorption (%) |
|---|---|---|---|---|---|---|
| Example 1 | Triglyceride of saturated fatty acids | 0.2 | 13 | 80 | 130 | 4.6 |
| 2 | Triglyceride of saturated fatty acids | 0.1 | 10 | 80 | 170 | 4.1 |
| 3 | Triglyceride of saturated fatty acids | 0.05 | 9 | 70 | 190 | 3.3 |
| 4 | Cetyl palmitate | 0.2 | 13 | 70 | 180 | 5.9 |
| Comparative example 1 | None | — | 9 | 60 | 270 | 2.8 |
| 2 | Sorbitan monopalmitate | 0.2 | 26 | 60 | 270 | 18.7 |
| 3 | Stearic acid | 0.2 | 24 | 70 | 230 | 15.2 |
| 4 | Triglyceride of hydroxystearic acid | 0.2 | 26 | 70 | 270 | 13.6 |
| 5 | A mixture of mono- and di-glyceride of oleic acid | 0.2 | 34 | 50 | 270 | 27.2 |
| 6 | A mixture of partial esters of glycerol with stearic acid | 0.2 | 22 | 80 | 220 | 10.4 |
| 7 | A mixture of partial esters of glycerol with stearic acid | 0.3 | 25 | 80 | 200 | 14.0 |
| 8 | A mixture of partial esters of glycerol with stearic acid | 0.4 | 28 | 80 | 190 | 16.6 |

EXAMPLE 5

Each four portions of 4 kg of the same expandable particles of polystyrene as used in Example 1 were gotten ready.

Similarly, 500 g of the same triglyceride of a fatty acid as used in Example 1, which was in a solid state, was treated in a porcelain ball mill for 30 minutes. The thus obtained powders were passed successively through sieves of 30, 60 and 100 mesh to obtain four groups of triglyceride powders, namely, (1) a triglyceride retained on a sieve of 30 mesh, (2) a triglyceride passing through a sieve of 30 mesh and retained on a sieve of 60 mesh, (3) a triglyceride passing through a sieve of 60 mesh and retained on a sieve of 100 mesh and (4) a triglyceride passing through a sieve of 100 mesh.

20 g of each group of the ester was added to the above-mentioned expandable particles of polystyrene and the mixture was introduced into a high-speed mixer to be treated for 40 seconds. Evaluations were conducted in the same manner as in Example 1. The results are shown in Table 2.

TABLE 2

| Grain size of triglyceride powder | Water content during molding (%) | Interior fusing degree (%) | Time required for cooling (second) |
|---|---|---|---|
| (1) retained on 30 mesh | 13 | 70 | 200 |
| (2) passing through 30 mesh and retained on 60 mesh | 12 | 70 | 170 |
| (3) passing through 60 mesh and retained on 100 mesh | 13 | 75 | 140 |
| (4) passing through 100 mesh | 14 | 80 | 130 |

As is clear from Table 2, it may be understood that the smaller the grain size of a triglyceride powder is, the greater the effect is for shortening the time required for cooling during molding. However, this fact does not mean that the grain size of a triglyceride must always be extremely small. It only means that, when a triglyceride of a larger grain size is used, sufficient effect cannot be given unless stirring is conducted for a long period of time.

The expandable particles of a styrene polymer according to this invention can reduce the time required for cooling when it is coated on the surface of the particles with an ester of an aliphatic carboxylic acid with an aliphatic alcohol, which is in a solid state at room temperature, and can solve the problems such as crack, deformation, the decrease of the properties, etc., which are caused by the permeation of the triglyceride into the styrene polymer during the storage of the treated particles when a triglyceride of a fatty acid, which is a liquid at room temperature, is used, and further gives good efficiency in the addition procedure.

Expandable particles of a styrene polymer incorporated with a liquid or solid surfactant give a high water content during molding or produce an article which is apt to absorb water and cause water-leakage when the article is a container or a structural part is brought into contact with water. In the case of the expandable particles of a styrene polymer according to this invention, water content during molding is low; water absorption, which is shown when the molded article is contacted with water, is low; and water leakage of an article, the decrease of the heat-insulating property due to the water absorption, etc., may hardly be caused.

What is claimed is:

1. Expandable particles of a styrene polymer containing a blowing agent, said particles having a surface coating consisting essentially of (i) an ester of a saturated fatty acid with a monohydric saturated aliphatic alcohol, or (ii) a triglyceride of a saturated fatty acid, said ester or triglyceride having no hydroxyl group in the molecule and being a solid at room temperature.

2. Expandable particles of a styrene polymer according to claim 1 or claim 1 wherein said ester or triglyceride is contained on the surface of the particles in an amount of 0.03–0.5% by weight calculated on the expandable particles of a styrene polymer.

3. Expandable particles of a styrene polymer according to claim 1 wherein said coating has a melting point of 50°–110° C.

4. Expandable particles of a styrene polymer according to claim 1 wherein said coating is a triglyceride.

5. Expandable particles of a styrene polymer according to claim 1 wherein said finely divided lubricant and said ester or triglyceride are contained on the surface of the particles in a ratio of 1/1–1/300 by weight.

6. Expandable particles or a styrene polymer according to claim 1 wherein said lubricant is a metal soap or a fatty acid amide.

7. Expandable particles of a styrene polymer according to claim 1, wherein said ester comprises a finely divided lubricant.

* * * * *

UNITED STATES PATENT AND TRADEMARK OFFICE
CERTIFICATE OF CORRECTION

PATENT NO. : 4,238,570
DATED : December 9, 1980
INVENTOR(S) : HIDEAKI SHIBATA et al It is certified that error appears in the above—identified patent and that said Letters Patent is hereby corrected as shown below:

Column 2, line 48 et seq.: The last sentence in the paragraph beginning with the word "However" should be a separate paragraph.

Column 3, line 32: Before "fine", "a" should be deleted.

Column 6, lines 28-29: Rewrite "adherees" as --adheres--.

Signed and Sealed this

Sixth Day of April 1982

|SEAL|

Attest:

Attesting Officer

GERALD J. MOSSINGHOFF

Commissioner of Patents and Trademarks